US011028748B2

(12) United States Patent
Kobashi et al.

(10) Patent No.: US 11,028,748 B2
(45) Date of Patent: Jun. 8, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Noriyasu Kobashi, Hachioji (JP); Takashi Nakamura, Toyota (JP); Tomokazu Akutsu, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 429 days.

(21) Appl. No.: 16/132,975

(22) Filed: Sep. 17, 2018

(65) Prior Publication Data

US 2019/0093533 A1 Mar. 28, 2019

(30) Foreign Application Priority Data

Sep. 27, 2017 (JP) .............................. JP2017-186393

(51) Int. Cl.
*F01N 3/20* (2006.01)
*F02D 41/14* (2006.01)
(Continued)

(52) U.S. Cl.
CPC ......... *F01N 3/206* (2013.01); *F02D 41/0082* (2013.01); *F02D 41/025* (2013.01); *F02D 41/029* (2013.01); *F02D 41/1408* (2013.01); *F02D 41/1454* (2013.01); *F02D 41/1475* (2013.01); *F02D 41/22* (2013.01); *F02D 41/2458* (2013.01); *F02D 41/40* (2013.01);
(Continued)

(58) Field of Classification Search
CPC ............... F02D 41/008; F02D 41/0082; F02D 41/0085; F02D 41/1408; F02D 41/2458; F01N 3/206; F01N 3/20
See application file for complete search history.

(56) References Cited

U.S. PATENT DOCUMENTS 7,934,487 B2 * 5/2011 Santoso .............. F02D 41/0082
123/435
8,474,247 B2 7/2013 Gomez, III
(Continued)

FOREIGN PATENT DOCUMENTS

FR 2 920 030 A3 2/2009
JP 2004-218541 8/2004
(Continued)

*Primary Examiner* — Phutthiwat Wongwian
*Assistant Examiner* — Arnold Castro
(74) *Attorney, Agent, or Firm* — Finnegan, Henderson, Farabow, Garrett & Dunner, LLP

(57) ABSTRACT

In a dither control process performed on a fuel injection valve, at least one cylinder is set as a rich combustion cylinder and another cylinder is set as a lean combustion cylinder. A dither control process is executed in a first mode when a vehicle is driven in a normal manner by a user. The dither control process is executed in a second mode on condition that a command signal for performing a temperature raising process on the exhaust gas purifier is input from a device outside the vehicle at a repair shop. The absolute value of the difference between the air-fuel ratio of the lean combustion cylinder and the air-fuel ratio of the rich combustion cylinder obtained by the dither control process is set to be greater in the second mode than in the first mode.

7 Claims, 5 Drawing Sheets

(51) Int. Cl.
*F02D 41/24* (2006.01)
*F02D 41/40* (2006.01)
*F02D 43/00* (2006.01)
*F02D 45/00* (2006.01)
*F02P 5/15* (2006.01)
*F02D 41/02* (2006.01)
*F02D 41/00* (2006.01)
*F02D 41/22* (2006.01)
*B60W 20/00* (2016.01)
*F02D 29/02* (2006.01)
*B60W 10/06* (2006.01)

(52) U.S. Cl.
CPC ............ *F02D 43/00* (2013.01); *F02D 45/00* (2013.01); *F02P 5/1502* (2013.01); *B60W 10/06* (2013.01); *B60W 20/00* (2013.01); *F02D 29/02* (2013.01); *F02D 2200/0812* (2013.01); *F02D 2400/11* (2013.01)

(56) References Cited

U.S. PATENT DOCUMENTS

| | | | |
|---|---|---|---|
| 9,032,942 B2* | 5/2015 | Suzuki | F02D 41/008 123/673 |
| 2015/0292426 A1 | 10/2015 | Jerzembeck et al. | |
| 2019/0032585 A1* | 1/2019 | Kelly | F02B 39/10 |
| 2019/0093532 A1* | 3/2019 | Myojo | F02D 41/029 |
| 2019/0107067 A1* | 4/2019 | Akutsu | F02D 41/025 |
| 2019/0107068 A1* | 4/2019 | Nose | F02D 41/1446 |
| 2019/0107070 A1* | 4/2019 | Ikuta | F02D 41/008 |
| 2019/0170072 A1* | 6/2019 | Yoshikawa | F02P 5/15 |
| 2019/0264595 A1* | 8/2019 | Pekrul | F01N 11/007 |
| 2019/0292956 A1* | 9/2019 | Shibuya | F02D 41/1454 |
| 2019/0301384 A1* | 10/2019 | Shibuya | F02D 41/008 |
| 2019/0316535 A1* | 10/2019 | Imai | F02D 41/1441 |

FOREIGN PATENT DOCUMENTS

| | | |
|---|---|---|
| JP | 2007-297949 A | 11/2007 |
| JP | 2008-196394 A | 8/2008 |
| JP | 2009-036183 | 2/2009 |
| JP | 2009-156100 A | 7/2009 |
| JP | 2012-057492 A | 3/2012 |
| JP | 2013-181517 A | 9/2013 |

* cited by examiner

CONTROLLER AND CONTROL METHOD FOR INTERNAL COMBUSTION ENGINE

BACKGROUND

The present disclosure relates to a device and a method for controlling an internal combustion engine of a vehicle in which the internal combustion engine includes an exhaust gas purifier, which purifies exhaust gas discharged from a plurality of cylinders, and a fuel injection valve, which is provided for each of the cylinders.

Japanese Laid-Open Patent Publication No. 2004-218541 describes a control device (controller) in which, when there is a request for raising the temperature of a catalytic device (catalyst), the air-fuel ratio in some cylinders is set to be richer than the stoichiometric air-fuel ratio and the air-fuel ratio in the remaining cylinders is set to be leaner than the stoichiometric air-fuel ratio.

When executing the dither control, the torque generated by the combustion in the rich combustion cylinder is greater than the torque generated by the combustion in the lean combustion cylinder. This increases torque fluctuation of the internal combustion engine as compared with when the air-fuel ratio is the same in every one of the cylinders.

When decreasing an absolute value of a difference between the air-fuel ratio of a rich combustion cylinder and the air-fuel ratio of a lean combustion cylinder to reduce torque fluctuation, the temperature raising capability of the dither control decreases. Thus, the absolute value of the difference cannot be decreased when the need for raising the temperature is more important than reducing torque fluctuation.

SUMMARY

Examples of the present disclosure will now be described.

Example 1. A control device for an internal combustion engine. The internal combustion engine is installed in a vehicle and includes an exhaust gas purifier that purifies exhaust gas discharged from a plurality of cylinders and a plurality of fuel injection valves that are respectively provided for the cylinders. The control device is configured to execute a dither control process for operating the fuel injection valves to set at least one of the cylinders as a rich combustion cylinder and to set at least another one of the cylinders that differs from the at least one of the cylinders as a lean combustion cylinder. The rich combustion cylinder has an air-fuel ratio that is richer than a stoichiometric air-fuel ratio. The lean combustion cylinder has an air-fuel ratio that is leaner than the stoichiometric air-fuel ratio. The dither control process is executed in a first mode when the vehicle is driven in a normal manner by a user. The dither control process is executed in a second mode on condition that a command signal for performing a temperature raising process on the exhaust gas purifier is input from a device outside the vehicle at a repair shop. The control device is also configured to execute a process for setting an absolute value in the second mode to be greater than an absolute value set in the first mode. The absolute value is an absolute value of a difference between the air-fuel ratio of the lean combustion cylinder and the air-fuel ratio of the rich combustion cylinder resulting from the dither control process.

In the above configuration, the absolute value of the difference is smaller in the first mode than in the second mode. Thus, torque fluctuations are reduced when the vehicle is driven in a normal manner by the user. In the second mode, the vehicle is not driven in a normal manner by the user, and there is no need to put priority on limiting drivability deterioration that would result from the dither control process. Thus, the absolute value of the difference is set to be larger in the second mode than in the first mode. Accordingly, when a command signal for performing the temperature raising process on the exhaust gas purifier is input at the repair shop, significance can be put on the temperature raising effect of the dither control process.

Example 2. In the control device according to example 1, an execution region of the dither control process in the second mode includes a region having a lower load than an execution region of the dither control process in the first mode.

When the load is large, the exhaust gas temperature when the dither control process is not executed is higher than that when the load is small. Thus, when the load is large, even if the absolute value of the difference between the air-fuel ratio of the rich combustion cylinder and the air-fuel ratio of the lean combustion cylinder is small, it is easy to fulfill the temperature raising request of the exhaust purifier. When setting the absolute value of the difference properly in a case in which the load is large, in the low load region, the temperature raising capability of the dither control process is insufficient. Therefore, the first mode is a mode that fulfills the temperature raising request with the dither control process, while reducing torque fluctuation. However, whether or not the dither control process can be executed in the first mode depends on how the user drives the vehicle. In the second mode, torque fluctuation is allowed. However, a region having a lower load than the first mode is included in the execution region of the dither control process so that the temperature raising request can be fulfilled without the need to continuously operate the internal combustion engine in a relatively high load region to execute the dither control process.

Example 3. In the control device according to example 1 or 2, the exhaust gas purifier includes an upstream exhaust gas purifier and a downstream exhaust gas purifier that is located at a downstream side of the upstream exhaust gas purifier. In the second mode, the dither control process is executed on condition that a command signal for performing a temperature raising process on the downstream exhaust gas purifier is input from a device outside the vehicle at the repair shop.

Since the downstream exhaust gas purifier is located farther from the combustion chamber of each cylinder than the upstream exhaust gas purifier, the downstream exhaust gas purifier is less susceptible to heat of the exhaust gas. Therefore, in response to the temperature raising request of the downstream exhaust gas purifier, there is a tendency of a request for increasing the temperature raising capability of the dither control process being generated. Therefore, in the above configuration, the dither control process of the second mode is executed in accordance with a temperature raising request of the downstream exhaust gas purifier.

Example 4. In the control device according example 3, the upstream exhaust gas purifier is a catalyst having an oxygen storage capability, and the downstream exhaust gas purifier is a filter that collects particulate matter from the exhaust gas.

In the above configuration, the temperature of the exhaust gas is raised by the reaction heat generated when oxygen discharged from the lean combustion cylinder reacts with the unburned fuel discharged from the rich combustion cylinder in the upstream exhaust gas purifier. Then, the exhaust gas flows into a filter which is a downstream exhaust gas purifier. This allows more heat to be provided to the filter than when dither control is not performed.

Example 5. The control device according to example 4 is configured to further execute an acquisition process for acquiring an amount of the particulate matter collected in the filter. In the first mode, the dither control process is executed without a command signal for performing a temperature raising process on the downstream exhaust gas purifier being input from a device outside the vehicle at the repair shop on condition that the amount of the particulate matter is greater than or equal to a predetermined amount.

In the above configuration, the dither control process is executed on condition that the amount of the particulate matter is greater than or equal to the predetermined amount without the input of a command signal for performing a temperature raising process on the exhaust gas purifier from a device outside the vehicle at the repair shop. Accordingly, the filter regeneration process does not have to be performed at the repair shop.

Example 6. A method for controlling an internal combustion engine that executes the processes described in examples 1 to 5 is embodied.

Example 7. A non-transitory computer readable recording medium that stores a program that has a processing device execute control processes described in examples 1 to 5 on an internal combustion engine is embodied.

Other aspects and advantages of the present invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION

One embodiment of a control device (controller) for an internal combustion engine will now be described with reference to the drawings.

Figure 1:
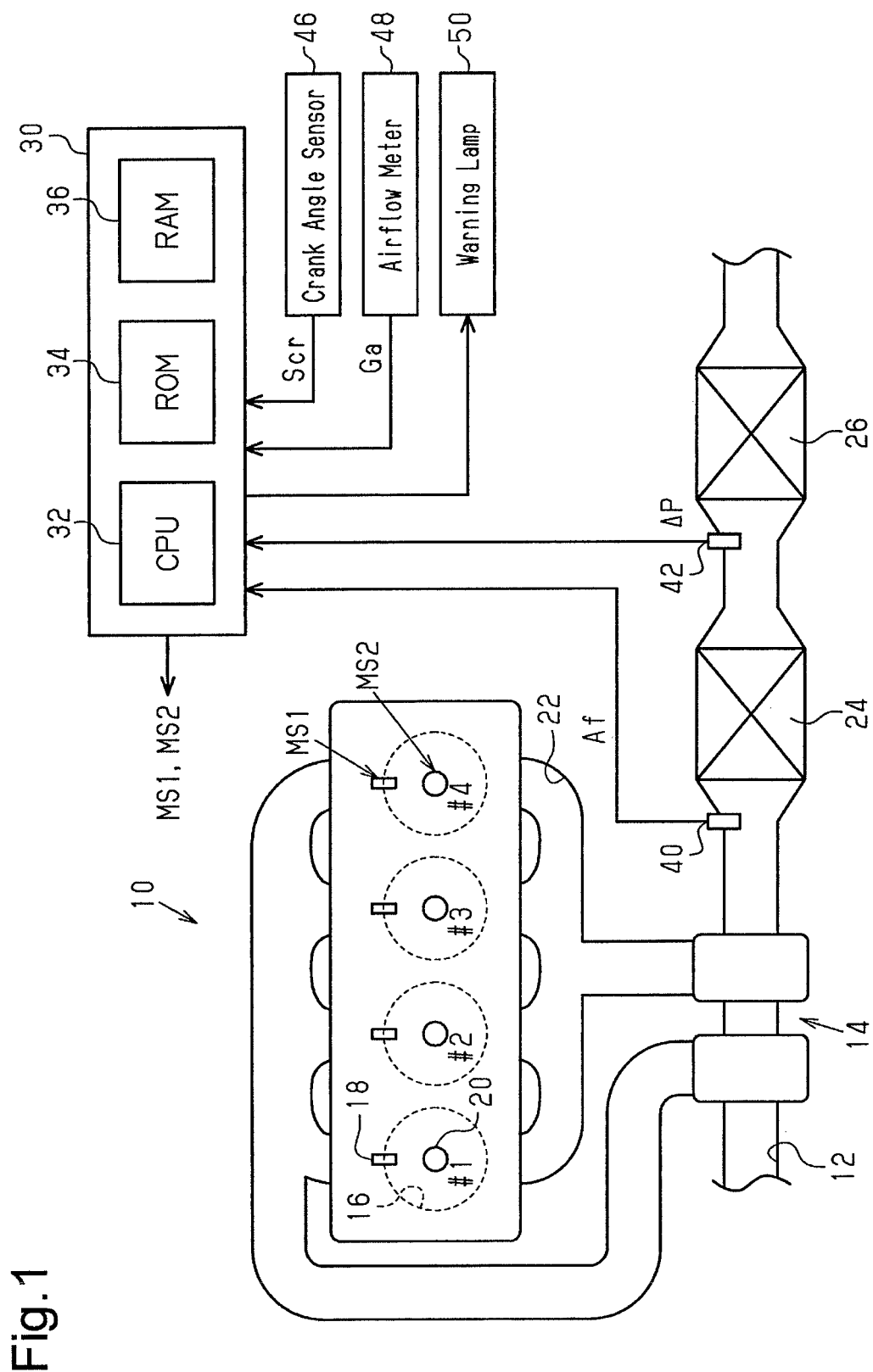
FIG. 1 is a diagram illustrating a control device and an internal combustion engine according to one embodiment.

In an internal combustion engine 10 illustrated in FIG. 1, air suctioned from an intake passage 12 flows into combustion chambers 16 of cylinders #1 to #4 via a supercharger 14. Each of cylinders #1 to #4 is provided with a fuel injection valve 18 for injecting fuel and an ignition device 20 for generating a spark discharge. In the combustion chamber 16, an air-fuel mixture of air and fuel is burned, and the burned air-fuel mixture is discharged as exhaust gas to an exhaust gas passage 22. A three-way catalyst 24 having oxygen storage capability is provided at the downstream side of the supercharger 14 in the exhaust gas passage 22. Further, a gasoline particulate filter (GPF 26) is provided at the downstream side of the three-way catalyst 24 in the exhaust gas passage 22.

A control device (controller) 30 operates operating units of the internal combustion engine 10, such as the fuel injection valves 18 or the ignition devices 20, to control a control amount (torque, exhaust component, etc.) of the internal combustion engine 10 that is subject to control. In such a case, the control device 30 refers to an air-fuel ratio Af detected by an air-fuel ratio sensor 40 provided at the upstream side of the three-way catalyst 24 or a differential pressure $\Delta P$ between the upstream pressure of the GPF 26 detected by a differential pressure sensor 42 and the atmospheric pressure. Here, the differential pressure $\Delta P$ is an amount that becomes positive when the upstream pressure exceeds the atmospheric pressure and corresponds to an amount obtained by subtracting the downstream pressure from the upstream pressure of the GPF 26. Further, the control device 30 refers to an output signal Scr of a crank angle sensor 46 or an intake air amount Ga detected by an airflow meter 48. The control device 30 includes a CPU 32, a ROM 34, and a RAM 36. The control device 30 controls the control amount by executing programs stored in the ROM 34 with the CPU 32.

Figure 2:
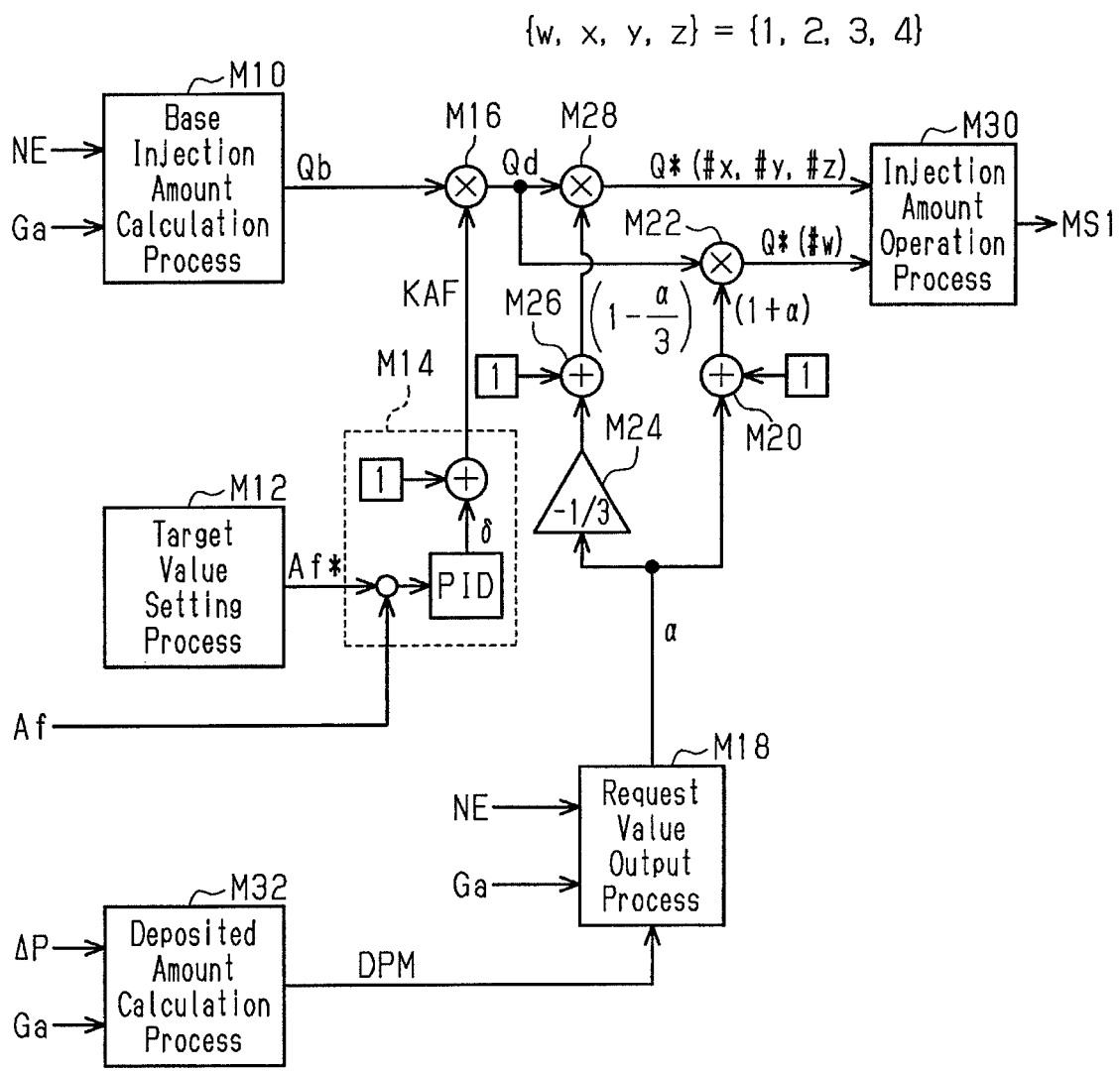
FIG. 2 is a block diagram illustrating part of a process executed by the control device in the internal combustion engine of FIG. 1.

FIG. 2 illustrates some of the process implemented by the CPU 32 when executing the programs stored in the ROM 34.

A base injection amount calculation process M10 is a process for calculating a base injection amount Qb, serving as an open loop operation amount that is an operation amount for performing an open-loop control so that the air-fuel ratio of the air-fuel mixture in the combustion chamber 16 becomes equal to a target air-fuel ratio, from the rotational speed NE, which is based on the output signal Scr of the crank angle sensor 46, and the intake air amount Ga.

A target value setting process M12 is a process for setting a target value Af* of a feedback control amount to control the air-fuel ratio of the air-fuel mixture in the combustion chamber 16 to be equal to the target air-fuel ratio.

A feedback process M14 is a process for calculating a feedback operation amount KAF that is an operation amount for feedback-controlling the air-fuel ratio Af, which is the feedback control amount, to be equal to the target value Af*. In the present embodiment, the sum of the output values of a proportional element, an integral element, and a differential element that use the difference between the target value Af* and the air-fuel ratio Af as an input is set as a correction ratio $\delta$ of the base injection amount Qb. The feedback operation amount KAF is set as "1+$\delta$".

A request injection amount calculation process M16 is a process for multiplying the base injection amount Qb by the feedback operation amount KAF to correct the base injection amount Qb and calculate the request injection amount Qd.

A request value output process M18 calculates and outputs an injection amount correction request value $\alpha$ (hereinafter referred to as the correction request value $\alpha$) of the dither control that causes the components of the entire exhaust gas discharged from each of cylinders #1 to #4 of the internal combustion engine 10 to differ between cylinders while setting the air-fuel ratio of the burned air-fuel mixture in every one of cylinders #1 to #4 to be equal to the target air-fuel ratio. Here, in the dither control according to the present embodiment, one of the first to fourth cylinders #1 to #4 is set as a rich combustion cylinder of which the air-fuel ratio of the air-fuel mixture is richer than the stoichiometric air-fuel ratio. The remaining three cylinders are set as lean combustion cylinders of which the air-fuel ratio of the air-fuel mixture is leaner than the stoichiometric air-fuel ratio. Further, the injection amount of the rich combustion cylinder is set to "1+α" times greater than the request injection amount Qd, and the injection amount in the lean combustion cylinder is set to "1−(α/3)" times greater than the request injection amount Qd. As long as the same amount of air is delivered into each of cylinders #1 to #4, with the components of the entire exhaust gas discharged from each of cylinders #1 to #4 of the internal combustion engine 10, the setting of the injection amount for a lean combustion cylinder and a rich combustion cylinder results in the air-fuel ratio of the air-fuel mixture burned in every one of cylinders #1 to #4 being equal to the target air-fuel ratio. With the setting of the injection amount, if the same amount of air is delivered into cylinders #1 to #4, a reciprocal of an average value of the fuel-air ratio of the air-fuel mixture burned in each cylinder will be the target air-fuel ratio. The "fuel-air ratio" is the reciprocal of the air-fuel ratio.

A correction coefficient calculation process M20 is a process for adding the correction request value α to "1" to calculate the correction coefficient of the request injection amount Qd for the rich combustion cylinder. A dither correction process M22 is a process for multiplying the request injection amount Qd by the correction coefficient "1+α" to calculate an injection amount command value Q* of cylinder #w that is set as the rich combustion cylinder. Here, "w" represents one of "1" to "4".

A multiplication process M24 is a process for multiplying the correction request value α by "−⅓." A correction coefficient calculation process M26 is a process for adding the output value of the multiplication process M24 to "1" and calculating a correction coefficient of the request injection amount Qd for a lean combustion cylinder. A dither correction process M28 is a process for multiplying the request injection amount Qd by the correction coefficient "1−(α/3)" to calculate the injection amount command value Q* of cylinders #x, #y and #z that are the lean combustion cylinders. Here, "x," "y," and "z" are any one of "1" to "4," and "w, x," "y," and "z" are different from each other.

An injection amount operation process M30 generates an operation signal MS1 for the fuel injection valve 18 of cylinder #w, which is a rich combustion cylinder, based on the injection amount command value Q* output from the dither correction process M22, outputs the operation signal MS1 to the fuel injection valve 18, and operates the fuel injection valve 18 so that the amount of fuel injected from the fuel injection valve 18 becomes an amount corresponding to the injection amount command value Q*. Further, the injection amount operation process M30 generates an operation signal MS1 of the fuel injection valves 18 of cylinders #x, #y, and #z, which are lean combustion cylinders, based on the injection amount command value Q* output from the dither correction process M28, outputs the operation signal MS1 to the fuel injection valve 18, and operates the fuel injection valve 18 so that the amount of fuel injected from the fuel injection valve 18 becomes equal to an amount corresponding to the injection amount command value Q*.

A deposited amount calculation process M32 is a process for calculating and outputting the amount of PM collected in the GPF 26 (PM deposited amount DPM) based on the differential pressure ΔP and the intake air amount Ga. When the differential pressure LP is high, the deposited amount calculation process M32 sets the PM deposited amount DPM to a larger value than when the differential pressure ΔP is low. When the intake air amount Ga is large, the deposited amount calculation process M32 sets the PM deposited amount DPM to a smaller value than when the intake air amount Ga is small. Specifically, the ROM 34 stores map data in which the differential pressure ΔP and the intake air amount Ga are set as input variables and the PM deposited amount DPM is set as an output variable, and the CPU 32 obtains the PM deposited amount DPM from the map. Further, the "map data" is a data set of discrete values of input variables and values of output variables respectively corresponding to the values of input variables. Further, for example, when the value of the input variable matches any one of the values of the input variable of the map data, the map calculation sets the value of the output variable of the corresponding map data as the calculation result. If there is no match, a value obtained by interpolating the values of a plurality of output variables included in the map data may be used as the calculation result.

The request value output process M18 sets the correction request value α to a value greater than "0" for a regeneration process (filter regeneration process) of the GPF 26 in accordance with the PM deposited amount DPM. As a result, oxygen discharged from the lean combustion cylinder reacts with the unburned fuel (including the incomplete combustion component) discharged from the rich combustion cylinder at the three-way catalyst 24, and the exhaust gas temperature rises. Further, the exhaust gas having the raised exhaust gas temperature flows into the GPF 26 and raises the temperature of the GPF 26.

Figure 3:
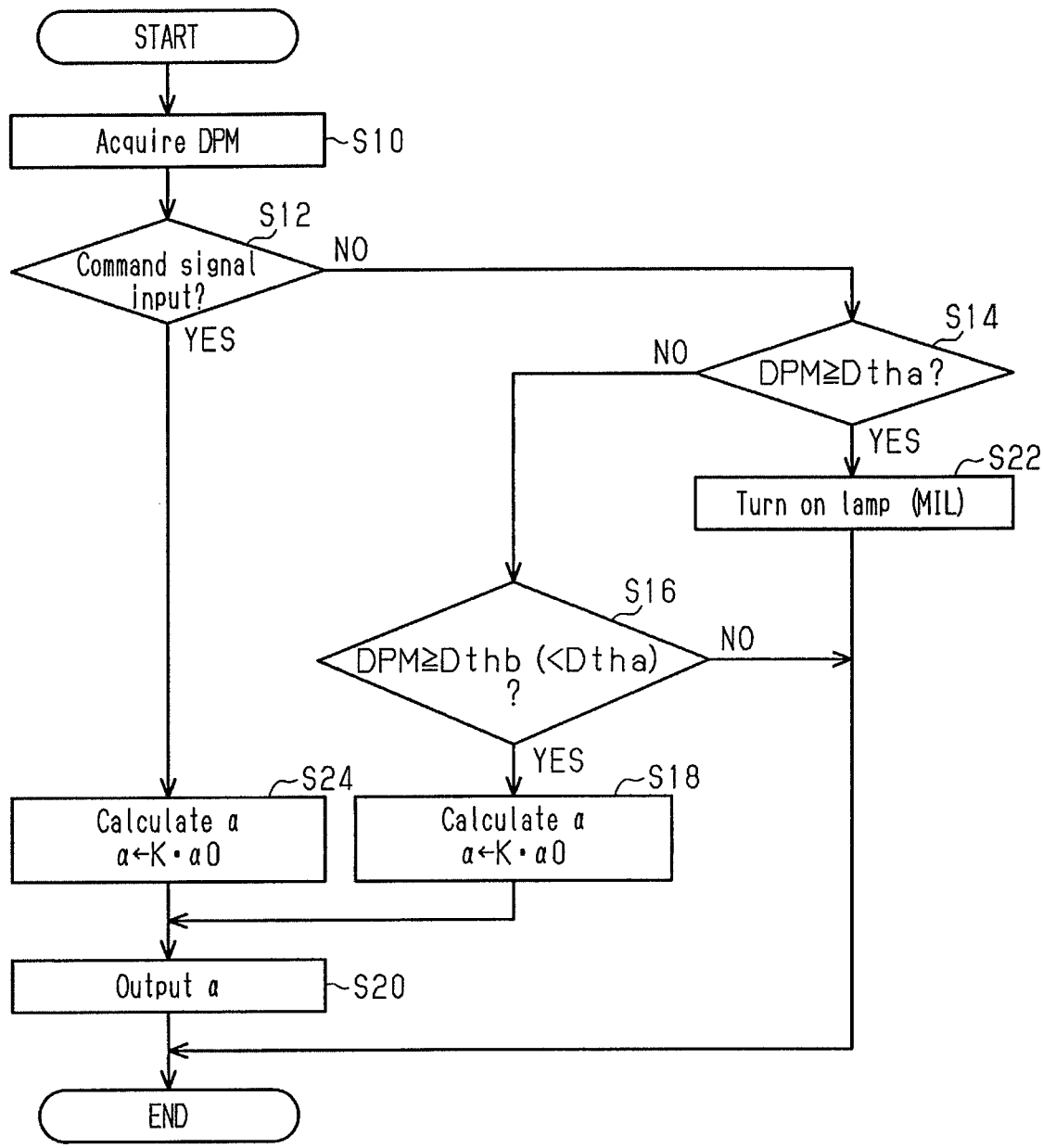
FIG. 3 is a flow chart illustrating a procedure of request value output process in the internal combustion engine of FIG. 1.

FIG. 3 illustrates the procedure of the request value output process M18. The CPU 32 implements the process illustrated in FIG. 3 by repeatedly executing the programs stored in the ROM 34, for example, in predetermined cycles. Hereinafter, the combination of S and a number, with S added in front of the number, represents a step number.

In the series of processes illustrated in FIG. 3, the CPU 32 first acquires the PM deposited amount DPM (S10). Next, the CPU 32 determines whether or not a command signal of a temperature raising process for a filter regeneration process is input to the control device 30 from an external device (S12). It is assumed here that the command signal is input from a maintenance device to the control device 30 in a state in which a dedicated troubleshooting device (maintenance device) is connected to the control device 30 by a repair shop. That is, the process of S12 is a process for determining whether or not the vehicle is undergoing a filter regeneration process at a repair shop to where the user has brought the vehicle. Further, the filter regeneration process of the repair shop does not necessarily have to be executed in the repair shop. For example, a serviceman of the repair shop may execute the filter generation process by driving the vehicle on a road.

When it is determined that a command signal of the temperature raising process for the filter regeneration process has not been input to the control device 30 from an external device (S12: NO), the CPU 32 determines whether or not the PM deposited amount DPM is greater than or equal to a specified amount Dtha (S14). Here, the specified amount Dtha is set to a value at which the PM deposited amount DPM is considerably large such that there is a possibility of the operation of the internal combustion engine 10 being obstructed if nothing is done with the PM deposited amount DPM. When determining that the PM deposited amount DPM is less than the specified amount Dtha (S14: NO), the CPU 32 determines whether or not the PM deposited amount DPM is greater than or equal to a predetermined amount Dthb that is smaller than the specified amount Dtha (S16). Here, the predetermined amount Dthb is set to a value at which it is desirable that the deposited particulate matter be removed from the GPF 26 although even if the particulate matter is not removed, the particulate matter would not obstruct operation of the internal combustion engine 10.

When determining that the PM deposited amount DPM is greater than or equal to the predetermined amount Dthb (S16:YES), the CPU 32 calculates a correction request value α (S18). Here, the CPU 32 calculates the correction request value α by multiplying the basic value α0 by the correction coefficient K, which is variably set in accordance with the rotational speed NE and the load factor KL. Here, the load factor KL is a parameter indicating the amount of air sent into the combustion chamber 16 and calculated based on the intake air amount Ga by the CPU 32. The load factor KL is the ratio of the inflow air amount per combustion cycle per cylinder to the reference inflow air amount. The reference inflow air amount may be an amount that is variably set in accordance with the rotational speed NE.

Figure 4:
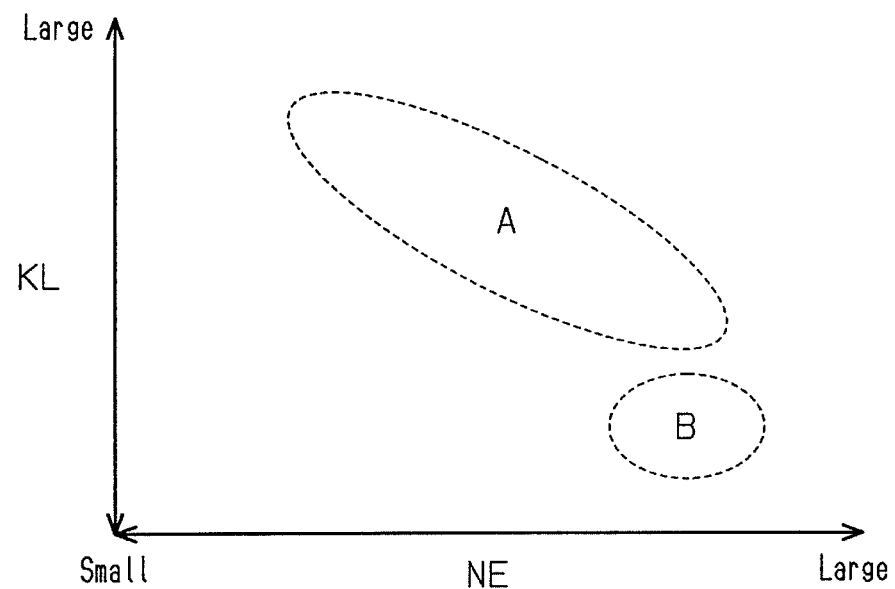
FIG. 4 is a diagram illustrating an execution region of a dither control process in the internal combustion engine of FIG. 1.

The CPU 32 sets the correction coefficient K to "0" when the operating point determined from the rotational speed NE and the load factor KL of the internal combustion, engine 10 deviates from the relatively high load region A illustrated in FIG. 4. This is because if the load is small, the exhaust gas temperature when the dither control is not executed is low. Thus, in order to satisfy the temperature raising request for the filter regeneration process by the dither control, it is necessary to increase the correction request value α to a level at which the rotational fluctuation of the crankshaft of the internal combustion engine 10 is easily perceived by the user. When the operating point of the internal combustion engine 10 enters region A, the CPU 32 variably sets the correction coefficient K in a range greater than zero and less than or equal to 1 in accordance with the operating point. Here, for example, taking into account that the exhaust gas flow rate per unit time when the rotational speed NE is large will be larger than that when the rotational speed NE is small, the correction coefficient K can be set to a small value. Further, for example, taking into account that the exhaust gas flow rate per unit time will be larger when the load factor KL is large than when the load factor KL is small, the correction coefficient K can be set to a small value. Specifically, the ROM 34 stores map data having the rotational speed NE and the load factor KL as input variables and the correction coefficient K as an output variable, and the CPU 32 obtains the correction coefficient K from the map.

Returning to FIG. 3, when calculating the correction request value α, the CPU 32 outputs a correction request value α (S20).

When determining that the PM deposited amount DPM is greater than or equal to the prescribed amount Dtha (S14: YES), the CPU 32 operates a warning lamp 50 illustrated in FIG. 1 and prompts the user of the vehicle, on which the internal combustion engine 10 is mounted, to have a repair shop execute a process for performing a filter regeneration process since the PM deposited amount DPM is large (S22).

Further, when determining that a command signal of the temperature raising process for filter regeneration process has been input to the control device 30 from an external device (S12: YES), the CPU 32 calculates the correction request value α (S24). Here, the CPU 32 calculates the correction request value α by multiplying the basic value α0 by the correction coefficient K variably set in accordance with the rotational speed NE and the load factor KL. The CPU 32 sets the correction coefficient K to "0" when the operating point of the internal combustion engine 10 deviates from region B having a load less than region A as illustrated in FIG. 4. Further, when the operating point of the internal combustion engine 10 enters region B, the CPU 32 variably sets the correction coefficient K in the range greater than zero and less than or equal to 1 depending on the operating point. Specifically, map data having the rotational speed NE and the load factor KL as input variables and the correction coefficient K as an output variable are stored in the ROM 34, and the correction coefficient K may be map calculated by the CPU 32.

Figure 5:
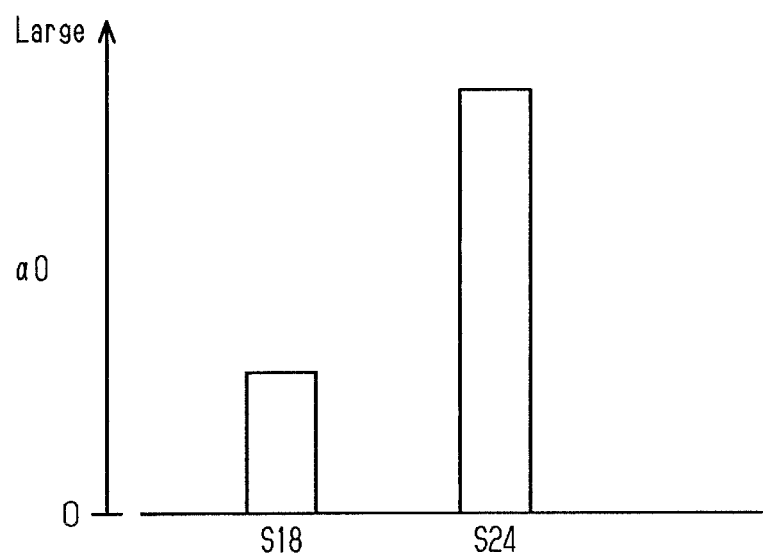
FIG. 5 is a diagram illustrating a basic value of an injection amount correction request value in the internal combustion engine of FIG. 1.

As illustrated in FIG. 5, the CPU 32 sets the basic value α0 in the process of S24 to a value more than the basic value α0 in the process of S18. This is a setting for securing the temperature raising capability required for filter regeneration process so as to execute the dither control in region B having a load less than region A.

Returning to FIG. 3, when the process of S24 is completed, the CPU 32 proceeds to the process of S20. When the processes of S20 and S22 are completed or when a negative determination is made in the process of S16, the CPU 32 temporarily ends the series of processes illustrated in FIG. 3

The operation of the present embodiment will now be described.

When the PM deposited amount DPM is greater than or equal to the prescribed amount Dtha, the CPU 32 prompts the user to take the vehicle to a repair shop by turning on the warning lamp 50. As a result, in a state in which a maintenance device is connected to the control device 30 and a command signal of the temperature raising process for the filter regeneration process is input, when the internal combustion engine 10 is running and the vehicle is traveling, the CPU 32 sets the correction request value α to a larger value to execute the dither control as compared with when the vehicle is driven in a normal manner by the user.

Figure 6:
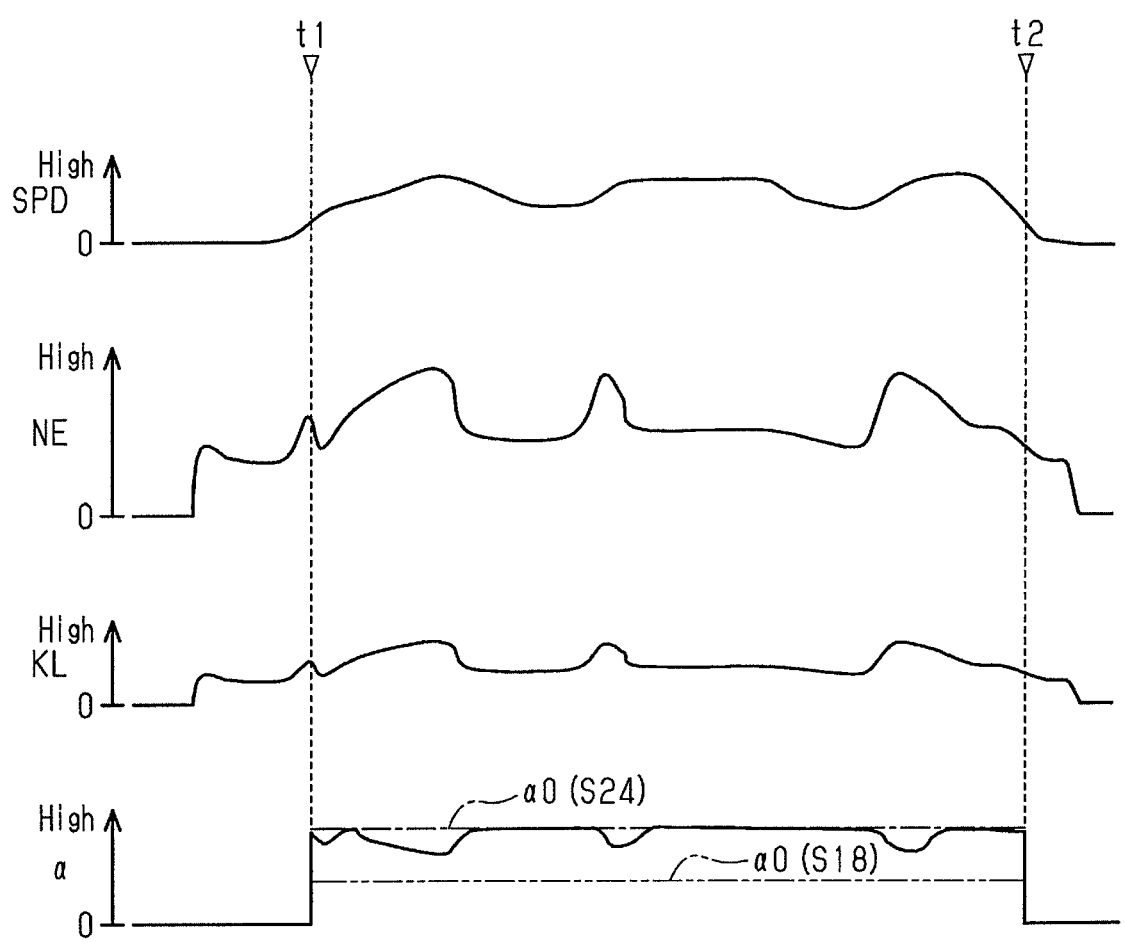
FIG. 6 is a time chart illustrating a dither control process in the internal combustion engine of FIG. 1.

FIG. 6 exemplifies the transition of the correction request value α for the dither control in a state in which a maintenance device is connected to the control device 30 and a command signal of the temperature raising process for filter regeneration process is input. More specifically, FIG. 6 illustrates the transition of the vehicle speed SPD, the rotational speed NE, the load factor KL, and the correction request value α. In FIG. 6, it is assumed that the operating point of the internal combustion engine 10 is in region B during the period from time t1 to time t2. As illustrated in FIG. 6, the basic value α0 (the basic value α0 in the process of S24) when the command signal is input is greater than the basic value α0 (the basic value α0 in the process of S18) when the command signal is not input. This allows the correction request value α can be set to a large value. Therefore, when the user is not driving the vehicle and there is no need to take into account torque fluctuation of the internal combustion engine 10 perceived by the user, the temperature raising effect of the dither control can be enhanced.

Since the temperature raising effect of the dither control can be enhanced, the dither control can be executed in region B in which the load is relatively small. Therefore, when the command signal is input at the repair shop, the dither control can be executed without driving the vehicle in a state maintained at a relatively high load state for a certain period of time. Consequently, the temperature raising process for the regeneration process of the GPF 26 can be quickly performed in an ensured manner since the filter regeneration process can be performed when traveling on a road near the repair shop.

Corresponding Relationship

The corresponding relationship between the items in the above embodiment and the items described in the above "Summary" are as follows. Hereinafter, the corresponding relationship is described for each number in the "Summary.".

[1] "Exhaust gas purifier" corresponds to the three-way catalyst 24 and the GPF 26. The "dither control process" corresponds to the correction coefficient calculation process M20, the dither correction process M22, the multiplication process M24, the correction coefficient calculation process M26, the dither correction process M28, and the injection amount operation process M30 when the correction request value α is greater than zero. "First mode" corresponds to a dither control process executed using the correction request value α calculated in the process of S18, and "second mode" corresponds to the dither control process executed using the correction request value α calculated in the process of S24.

[2] "Execution region in second mode" corresponds to region B in FIG. 4, and "execution region in first mode" corresponds to region A in FIG. 4.

[3] "Upstream exhaust gas purifier" corresponds to the three-way catalyst 24, and "downstream exhaust gas purifier" corresponds to the GPF 26.

[5] "Acquisition process" corresponds to the process of S10.

<Other Embodiments>

At least one of the items of the above embodiment may be changed as follows.

"First Mode and Second Mode"

In the above-described embodiment, the dither control process executed when the vehicle is driven in a normal manner by the user in the first mode is set as the dither control process for filter regeneration process executed on condition that the PM deposited amount DPM is greater than or equal to the predetermined amount Dthb. Instead, for example, the dither control process performed in accordance with the warming-up request of the three-way catalyst 24 described in the column of "temperature raising request for exhaust gas" below may be used as the dither control process executed when the vehicle is driven in a normal manner by the user in the first mode. Further, for example, the dither control process for a sulfur removal process performed on the three-way catalyst 24 and described in "temperature raising request for exhaust gas" may be used as the dither control process executed when the vehicle is driven in a normal manner by the user in the first mode.

In the above embodiment, the dither control process for filter regeneration process is set as the dither control process in the second mode. Instead, for example, the dither control process for the sulfur removal process may be used as the dither control process in the second mode. Further, for example, as described below in "exhaust gas purifier," when the second three-way catalyst is provided at the downstream side of the three-way catalyst 24 as viewed in FIG. 1, the dither control process for the sulfur removal process of the second three-way catalyst may be used as the dither control process in the second mode.

In the above embodiment, the correction request value α calculated in the process of S24 is set to be greater than the correction request value α calculated in the process of S18. That is, in the above embodiment, the dither control process executed when the vehicle is driven in a normal manner by the user is set as the first mode, and the dither control process for the filter regeneration process is set as the second mode. Further, in each of the first mode and the second mode, the absolute value of the difference between the air-fuel ratio of the rich combustion cylinder and the air-fuel ratio of the lean combustion cylinder is obtained. Further, by setting the correction request value α in the second mode S24 to be greater than the correction request value α in the first mode S18, the integral value of the second mode is set to be greater than the integral value in the first mode. Therefore, when a command signal of the temperature raising process of the exhaust purifier is input at the repair shop, significance is put on the temperature raising effect of the dither control process.

"Execution Region of Dither Control Process"

The execution region of the dither control in the first mode and the second mode is not limited to the example illustrated in FIG. 4. For example, the execution region of the dither control in the second mode may be set as region B and region A illustrated in FIG. 4. Accordingly, when roads near the repair shop include a desirable road for operating the internal combustion engine 10 under a high load, it is easy to continuously execute the dither control process. Further, for example, as described in the column of "first mode and second mode," when setting the first mode to a mode for executing the dither control process to warm-up the three-way catalyst 24, the execution region of the dither control of the second mode may be set as a region in which the load is higher than the execution region of the dither control of the first mode. This is because the exhaust gas temperature is high even when the dither control process is not executed in a region in which the load is relatively high, and the dither control for warming-up the three-way catalyst 24 is executed only in a region in which the load is relatively small.

"Command Signal in Repair Shop"

In the above embodiment, the maintenance device is connected to the control device 30 and the command signal is input from the maintenance device to the control device 30. Instead, for example, a predetermined operation state that cannot be expected in a normal operation performed by the user, such as simultaneous depression, of the accelerator and the brake when the shift lever is in the neutral state, may be input as a command signal of the temperature raising process.

"PM Deposited Amount"

In the above embodiment, the PM deposited amount DPM is obtained from a map based on the differential pressure ΔP and the intake air amount Ga. Instead, for example, the PM deposited amount DPM may be obtained from the map when the intake air amount Ga is greater than or equal to a specified value. When the intake air amount Ga is less than the specified value, estimations can be made based on the rotational speed NE, the load factor KL, the temperature of the coolant (coolant temperature THW) in the internal combustion engine 10 and the air-fuel ratio Af. This can be executed, for example, as follows. Map data having the rotational speed NE and the load factor KL as input variables and the PM deposition increase amount per unit time as an output variable, map data having the coolant temperature THW as an input variable and the coolant temperature correction coefficient as an output variable, and map data having the air-fuel ratio Af as an input variable and an air-fuel ratio correction coefficient as an output variable are stored in the ROM 34. Further, after the CPU 32 obtains the PM deposition increase amount from the map, the CPU 32 multiplies the PM deposition increase amount by the coolant temperature correction coefficient and the air-fuel ratio correction coefficient to correct the PM deposition increase amount. In this manner, the PM deposited amount DPM is sequentially increased. When a state in which the intake air amount Ga is greater than or equal to the specified value is shifted to a state in which the intake air amount Ga is less than the specified value, the initial value of the PM deposited amount DPM may be set as a value calculated from the differential pressure ΔP. Further, when the intake air amount Ga is switched from a state less than the specified value to a state greater than or equal to the specified value, the PM deposited amount DPM calculated from the differential pressure ΔP is used.

Further, on condition that filter regeneration process is not performed and the differential pressure ΔP is not used, the PM deposited amount DPM may be estimated by sequentially integrating the PM deposition increase amount corrected by the coolant temperature correction coefficient and the air-fuel ratio correction coefficient. In this case, on condition that the temperature of the GPF 26 is raised to the filter regeneration temperature by the dither control process, the CPU 32 may sequentially calculate the amount of decrease in the PM deposited amount DPM to perform the decrease amount correction, based on the temperature of the GPF 26, which is recognized from the operating point of the internal combustion engine 10 and the correction request value α, and the PM deposited amount DPM. Preferably, the decrease amount is greater when the temperature of the GPF 26 is high than when the temperature is low. Preferably, the decrease amount is greater when the PM deposited amount DPM is large than when the PM deposited amount DPM is small.

For example, the PM deposited amount DPM may be detected with a dedicated sensor.

"Dither Control Process"

In the above embodiment, the correction request value α is calculated by multiplying the basic value α0 by the correction coefficient K determined from the rotational speed NE and the load factor KL. Instead, for example, a value variably set in accordance with the coolant temperature THW using the basic value α0 as the upper limit multiplied by the correction coefficient K may be used as the correction demand value α.

Further, for example, the correction request value α may be variably set based on three parameters, namely, the PM deposited amount DPM and two of three parameters including the rotational speed NE, the load factor KL, and the coolant temperature THW. Further, for example, the correction request value α may be variably set based on three parameters, namely, the PM deposited amount DPM, the coolant temperature THW, and one of the rotational speed NE and the load factor KL. Further, for example, the correction request value α may be variably set based on two of the four parameters of the PM deposited amount DPM, the rotational speed NE, the load factor KL and the coolant temperature THW, excluding the combination of the rotational speed NE and the load factor KL. Further, for example, the correction request value α may be variably set based on one of the four parameters described above. Further, for example, instead of using the rotational speed NE and the load factor KL as parameters for specifying the operating point of the internal combustion engine 10, for example, an accelerator operation amount serving as a load may be used instead of the load factor KL serving as a load. Further, instead of the rotational speed NE and the load, the correction request value α may be variably set based on the intake air amount Ga.

The correction request value α does not necessarily have to be variably set as a value greater than "0" based on the operating point of the internal combustion engine. For example, a single value greater than zero for processing S18 may be set in region A, and a single value greater than zero for processing S24 may be set in region B.

In the embodiment described above, the number of lean combustion cylinders is greater than the number of rich combustion cylinders. Instead, for example, the number of rich combustion cylinders may be the same as the number of lean combustion cylinders. Cylinders #1 to #4 do not all have to be set as a lean combustion cylinder or a rich combustion cylinder. For example, the air-fuel ratio of one cylinder may be set to be equal to the target air-fuel ratio. The reciprocal of the average value of the fuel-air ratio does not necessarily have to be set as the target air-fuel ratio as long as the in-cylinder delivered air amount is the same within one combustion cycle. For example, when there are four cylinders like in the above embodiment, as long as the in-cylinder charged air amount is the same, the reciprocal of the average value of the fuel-air ratio in five strokes or three strokes may be the target air-fuel ratio. However, it is desirable that at least one out of two combustion cycles includes a period in which the rich combustion cylinder and the lean combustion cylinder both exist. In other words, when the in-cylinder charged air amount is the same during a predetermined period, it is desirable that the predetermined period be two combustion cycles or less when setting the reciprocal of the average value of the fuel-air ratio to the target air-fuel ratio. For example, if a rich combustion cylinder exists only once in two combustion cycles during a predetermined period of two combustion cycles, when a rich combustion cylinder is set as R and a lean combustion cylinder is set as L, the order in which rich combustion cylinders and lean combustion cylinders are set is, for example, "R, L, L, L, L, L, L, and L." In this case, a period of one combustion cycle that is shorter than the predetermined period would have the order of "R, L, L, and L," and some of cylinders #1 to #4 would be lean combustion cylinders while others are rich combustion cylinders. However, when the reciprocal of the average value of the fuel-air ratio in a period that is not one combustion cycle is set as the target air-fuel ratio, it is desirable that the amount of air blown back to the intake passage by some of the air temporarily suctioned in the intake stroke before the intake valve INV closes be negligible in the internal combustion engine.

"Exhaust Gas Purifier"

In the above embodiment, the upstream exhaust gas purifier is set as the three-way catalyst 24 and the downstream exhaust gas purifier is set as the GPF 26. Instead, for example, each of the upstream exhaust gas purifier and the downstream exhaust gas purifier may be set as a first three-way catalyst and a second three-way catalyst, respectively. Further, for example, the upstream exhaust gas purifier may be a GPF and the downstream exhaust gas purifier may be a three-way catalyst.

In the above configuration, the three-way catalyst 24 and the GPF 26 are exemplified as the exhaust gas purifier. Instead, for example, the exhaust gas purifier may be configured by only the three-way catalyst 24. Alternatively, for example, the exhaust gas purifier may be configured by only the GPF 26. However, when a catalyst having an oxygen occlusion capability is not provided at the upstream side of the GPF, it is desirable that the GPF 26 have an oxygen storage capability to enhance the temperature raising effect of the dither control.

"Temperature Raising Request for Exhaust Gas"

The temperature raising request for exhaust gas is not limited to the temperature raising request of the GPF 26. For example, the temperature raising request may be a temperature raising request for a warming-up request of the three-way catalyst 24. Here, the warming-up request may be generated when a logical sum is true for condition (i) in which the integrated value InGa of the intake air amount Ga from the startup of the internal combustion engine 10 is greater than or equal to a first specified value Inth1 and condition (ii) in which the integrated value InGa is less than or equal to a second specified value Inth2 and the temperature of the coolant of the internal combustion engine 10 is less than or equal to a predetermined temperature THWth. In condition (i), the temperature at the upstream end portion of the three-way catalyst 24 is determined to be an active temperature. Further, in condition (ii), the entire three-way catalyst 24 is determined as not yet being active. For example, temperature raising request may be for the sulfur removal process of the three-way catalyst 24. Here, it is assumed that an execution request for the sulfur removal process of the three-way catalyst 24 is generated when the sulfur deposition amount exceeds a predetermined amount.

The temperature raising request is not limited to the one exemplified in the above embodiment. For example, a temperature raising request of the exhaust gas may be generated by the dither control to raise the temperature of the exhaust gas passage 22 and reduce the condensed water collected in the exhaust gas passage 22.

"Control Device"

The control device is not limited to a device that includes the CPU 32 and the ROM 34 and executes a software process. For example, at least some of the software processes in the above embodiment may be implemented by a dedicated hardware circuit (for example, ASIC or the like) and processed by hardware. That is, the control device may have any one of the following configurations (a) to (c). (a) The device includes a processing device (processor) that executes all the above processes with a program and a program storage device (including a non-transitory computer-readable recording medium) such as a ROM that stores the program. (b) The device includes a processing device and a program storage device and executes some of the above processes with a program and a dedicated hardware circuit that executes the remaining processes. (c) The apparatus includes a dedicated hardware circuit for executing all of the above processes. Here, a plurality of software processing circuits including the processing device and the program storage device or a plurality of dedicated hardware circuits may be used. That is, the above process may be executed by a processing circuit including at least one of one or more software processing circuits and one or more dedicated hardware circuits.

"Internal Combustion Engine"

The internal combustion engine is not limited to a four-cylinder internal combustion engine. For example, an in-line six-cylinder internal combustion engine may be used. Further, for example, an internal combustion engine such as a V-type internal combustion engine may include a first exhaust gas purifier and a second exhaust gas purifier, each purifying exhaust gas in different cylinders.

"Others"

Instead of injecting fuel into the combustion chamber 16, for example, the fuel injection valve may inject fuel into the intake passage 12. An air-fuel ratio feedback control does not necessarily have to be performed when executing the dither control.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A control device for an internal combustion engine, wherein the internal combustion engine is installed in a vehicle and includes an exhaust gas purifier that purifies exhaust gas discharged from a plurality of cylinders and a plurality of fuel injection valves that are respectively provided for the cylinders, the control device being configured to execute:

a dither control process for operating the fuel injection valves to set at least one of the cylinders as a rich combustion cylinder and to set at least another one of the cylinders that differs from the at least one of the cylinders as a lean combustion cylinder, wherein the rich combustion cylinder has an air-fuel ratio that is richer than a. stoichiometric air-fuel ratio, the lean combustion cylinder has an air-fuel ratio that is leaner than the stoichiometric air-fuel ratio, the dither control process is executed in a first mode when the vehicle is driven in a normal manner by a user, and the dither control process is executed in a second mode on condition that a command signal for performing a temperature raising process on the exhaust gas purifier is input from a device outside the vehicle at a repair shop; and a process for setting an absolute value in the second mode to be greater than an absolute value set in the first mode, wherein the absolute value is an absolute value of a difference between the air-fuel ratio of the lean combustion cylinder and the air-fuel ratio of the rich combustion cylinder resulting from the dither control process.

2. The control device according to claim 1, wherein an execution region of the dither control process in the second mode includes a region having a lower load than an execution region of the dither control process in the first mode.

3. The control device according to claim 1, wherein:

the exhaust gas purifier includes an upstream exhaust gas purifier and a downstream exhaust gas purifier that is located at a downstream side of the upstream exhaust gas purifier; and in the second mode, the dither control process is executed on condition that a command signal for performing a temperature raising process on the downstream exhaust gas purifier is input from a device outside the vehicle at the repair shop.

4. The control device according to claim 3, wherein the upstream exhaust gas purifier is a catalyst having an oxygen storage capability, and the downstream exhaust gas purifier is a filter that collects particulate matter from the exhaust gas.

5. The control device according to claim 4, wherein the control device is configured to further execute an acquisition process for acquiring an amount of the particulate matter collected in the filter, and in the first mode, the dither control process is executed without a command signal for performing a temperature raising process on the downstream exhaust gas purifier being input from a device outside the vehicle at the repair shop on condition that the amount of the particulate matter is greater than or equal to a predetermined amount.

6. A method for controlling an internal combustion engine, wherein the internal combustion engine is installed in a vehicle and includes an exhaust gas purifier that purifies exhaust gas discharged from a plurality of cylinders and a plurality of fuel injection valves that are respectively provided for the cylinders, the method comprising:

executing a dither control process for operating the fuel injection valves to set at least one of the cylinders as a rich combustion cylinder and to set at least another one of the cylinders that differs from the at least one of the cylinders as a lean combustion cylinder, wherein the rich combustion cylinder has an air-fuel ratio that is richer than a stoichiometric air-fuel ratio, and the lean combustion cylinder has an air-fuel ratio that is leaner than the stoichiometric air-fuel ratio;

executing the dither control process in a first mode when the vehicle is driven in a normal manner by the user;

executing the dither control process in a second mode on condition that a command signal for performing a temperature raising process on the exhaust gas purifier is input from a device outside the vehicle at a repair shop;

executing a process for setting an absolute value in the second mode to be greater than an absolute value set in the first mode, wherein the absolute value is an absolute value of a difference between the air-fuel ratio of the lean combustion cylinder and the air-fuel ratio of the rich combustion cylinder resulting from the dither control process.

7. A non-transitory computer readable recording medium that records a program that has a processing device execute a control process on an internal combustion engine, wherein the internal combustion engine is installed in a vehicle and includes an exhaust gas purifier that purifies exhaust gas discharged from a plurality of cylinders and a plurality of fuel injection valves that are respectively provided for the cylinders, the control process comprising:

executing a dither control process for operating the fuel injection valves to set at least one of the cylinders as a rich combustion cylinder and to set at least another one of the cylinders that differs from the at least one of the cylinders as a lean combustion cylinder, wherein the rich combustion cylinder has an air-fuel ratio that is richer than a stoichiometric air-fuel ratio, and the lean combustion cylinder has an air-fuel ratio that is leaner than the stoichiometric air-fuel ratio;

executing the dither control process in a first mode when the vehicle is driven in a normal manner by the user;

executing the dither control process in a second mode on condition that a command signal for performing a temperature raising process on the exhaust gas purifier is input from a device outside the vehicle at a repair shop;

executing a process for setting an absolute value in the second mode to be greater than an absolute value set in the first mode, wherein the absolute value is an absolute value of a difference between the air-fuel ratio of the lean combustion cylinder and the air-fuel ratio of the rich combustion cylinder resulting from the dither control process.

\* \* \* \* \*